United States Patent
Coombes et al.

(10) Patent No.: US 10,113,911 B2
(45) Date of Patent: Oct. 30, 2018

(54) AUTOMATED DYNAMIC LUMINAIRE IDENTIFICATION USING BARCODES

(71) Applicant: Gooee Limited, St Albans (GB)

(72) Inventors: Simon Coombes, St Petersburg, FL (US); Shmuel Silverman, Novato, CA (US)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/839,433

(22) Filed: Dec. 12, 2017

(65) Prior Publication Data

US 2018/0101186 A1    Apr. 12, 2018

Related U.S. Application Data

(63) Continuation-in-part of application No. 15/586,745, filed on May 4, 2017, now Pat. No. 9,874,478, which is a continuation-in-part of application No. 29/569,839, filed on Jun. 30, 2016, now Pat. No. Des. 808,826.

(Continued)

(51) Int. Cl.
| | |
|---|---|
| *G01J 3/50* | (2006.01) |
| *G01J 3/02* | (2006.01) |
| *G01J 1/02* | (2006.01) |
| *G01J 1/42* | (2006.01) |
| *G01J 3/51* | (2006.01) |
| *H05B 33/08* | (2006.01) |

(52) U.S. Cl.
CPC ............. *G01J 3/505* (2013.01); *G01J 1/0271* (2013.01); *G01J 1/4204* (2013.01); *G01J 3/0291* (2013.01); *G01J 3/51* (2013.01); *H05B 33/089* (2013.01)

(58) Field of Classification Search
CPC .. G01J 3/505; G01J 3/51; G01J 1/4204; G01J 1/0271; H05B 33/089
See application file for complete search history.

(56) References Cited

U.S. PATENT DOCUMENTS

| | | |
|---|---|---|
| D274,297 S | 6/1984 | Wright |
| D331,203 S | 11/1992 | Collister |
| (Continued) | | |

FOREIGN PATENT DOCUMENTS

| | | |
|---|---|---|
| EP | 1081631 A2 | 3/2001 |
| EP | 2149746 A2 | 2/2010 |
| (Continued) | | |

OTHER PUBLICATIONS alibaba.com, PDP Kinect TV Mount—Xbox One, 3 pgs., https://guide.alibaba.com/shop/pdp-kinect-tv-mount-xbox-one_3162680.html.

(Continued)

*Primary Examiner* — David V Bruce
(74) *Attorney, Agent, or Firm* — Moyles IP, LLC

(57) ABSTRACT

Automated dynamic devices, systems, and methods for identifying and commissioning lighting systems are disclosed. In particular, sensor systems are configured to read barcodes for identifying luminaires in a lighting system, and lumen levels of the luminaires are adjustable to provide appropriate lighting for the sensors to read the barcodes. The sensors may also be attached to sensor clips that allow sensors to be positioned in a variety of locations and orientations on different luminaires.

20 Claims, 12 Drawing Sheets

Related U.S. Application Data

(60) Provisional application No. 62/490,388, filed on Apr. 26, 2017, provisional application No. 62/582,742, filed on Nov. 7, 2017.

(56) References Cited

U.S. PATENT DOCUMENTS

| | | | |
|---|---|---|---|
| D346,791 S | 5/1994 | Marach et al. | |
| 5,581,071 A | 12/1996 | Chen et al. | |
| D431,198 S | 9/2000 | Monaco et al. | |
| D618,332 S | 6/2010 | Kimura et al. | |
| D627,503 S | 11/2010 | Postelmans | |
| 7,862,202 B2 | 1/2011 | Laso et al. | |
| D664,877 S | 8/2012 | Krumpe et al. | |
| D672,264 S | 12/2012 | Ochoa | |
| D695,592 S | 12/2013 | White | |
| 8,636,385 B2 | 1/2014 | Fabbri et al. | |
| 9,046,244 B2 | 6/2015 | Yang | |
| D742,334 S | 11/2015 | Pratt et al. | |
| 9,288,877 B2 | 3/2016 | Pratt et al. | |
| D757,344 S | 5/2016 | Reynolds | |
| 9,332,610 B2 | 5/2016 | Kuo et al. | |
| D762,583 S | 8/2016 | Dick | |
| D772,693 S | 11/2016 | Beadle | |
| D775,410 S | 12/2016 | Klus | |
| D775,512 S | 1/2017 | White | |
| 2006/0237636 A1 | 10/2006 | Lyons et al. | |
| 2008/0204437 A1 | 8/2008 | Jensen | |
| 2014/0001960 A1* | 1/2014 | Wendt | H05B 37/029 315/151 |
| 2015/0338077 A1 | 11/2015 | Johnson | |
| 2015/0373816 A1 | 12/2015 | Dherbassy | |
| 2017/0094755 A1 | 3/2017 | Daranyi et al. | |
| 2017/0272316 A1* | 9/2017 | Johnson | G06Q 10/103 |
| 2017/0286889 A1 | 10/2017 | Yu et al. | |

FOREIGN PATENT DOCUMENTS

| | | |
|---|---|---|
| JP | 2003086019 A1 | 3/2003 |
| WO | WO-2016039690 A1 | 3/2016 |

OTHER PUBLICATIONS

Double Radius, Ubiquiti Current Sensor, Clip-On Alternating Current, 2 pgs, http://www.doubleradius.com/Manufacturers/mFi-1/Ubiquiti-Current-Sensor-mFi-CS.html.

PCT Written Opinion of International App. No. PCT/IB2018/052911, dated Aug. 16, 2018, which is in the same family as U.S. Appl. No. 15/839,433, 11 pgs.

PCT Search Report of International App. No. PCT/IB2018/052911, dated Aug. 16, 2018, which is in the same family as U.S. Appl. No. 15/839,433, 4 pgs.

* cited by examiner

AUTOMATED DYNAMIC LUMINAIRE IDENTIFICATION USING BARCODES

CROSS REFERENCE TO RELATED APPLICATIONS

This application is a continuation-in-part of U.S. patent application Ser. No. 15/586,745 filed May 4, 2017, which claims priority to U.S. patent application Ser. No. 29/569,839 filed Jun. 30, 2016 and the benefit of U.S. Provisional Patent Application Ser. No. 62/490,388 filed Apr. 26, 2017. This application also claims the benefit of United States Provisional Patent Application Serial No. 62/582,742 filed Nov. 7, 2017. The disclosure of each of the above applications is incorporated herein by reference in their entireties.

FIELD OF THE DISCLOSURE

Devices, systems, and methods for automated luminaire identification are generally described. In particular, devices, systems, and methods for automated dynamic luminaire identification using sensor-read barcodes are disclosed. For purposes of this disclosure, the phrases "devices," "systems," and "methods" may be used either individually or in any combination referring without limitation to disclosed components, grouping, arrangements, steps, functions, or processes.

BACKGROUND OF THE DISCLOSURE

In lighting control systems with networked lighting devices such as, for example and without limitation, luminaires having light sources such as Light Emitting Diodes (LED's), sensors, and network communication gateways, each of the lighting devices and their associated network addresses must be correctly identified to facilitate among other things, initialization, location and group identification, maintenance, and lighting control. For purposes of this disclosure, "networked" means generally and without limitation part of an identification or control system that may be automatically or remotely controlled. In typical, known lighting control systems, operational configuration and control generally includes manually identifying a device such as a luminaire and/or a light source including the associated driver for the light source, manually assigning the device to its physical location, manually grouping the device within a group of devices in close proximity that may together coordinate control of lumen levels in an environment in which the luminaires are physically located, setting dimming control protocols according to, for example, manufacturers' recommendations, manually monitoring operation of the device, manually testing the device for sufficient lumen performance, replacing the device when required, etc. For purposes of this disclosure, a "driver" is generally and without limitation a device or system that controls illumination of a luminaire—such as a dimming control interface—but may also refer to any component that actuates a device, system, or method consistent with this disclosure. For purposes of this disclosure, "environment" means generally and without limitation a space or area in which a luminaire or lighting system is installed.

Known methods for identifying luminaires and/or other associated components include, for example, manually copying an identification (ID) number and/or removing a physical, detachable printed ID label from a lighting device and placing it on a floorplan to manually record the device's location. The detachable printed ID label may be a scan-able image or code sticker for physical affixation to the floorplan. The ID number and/or label is taken from the device upon installation and manually added to a floorplan or an installation drawing depicting the location. The floorplan/installation drawing may then be used to identify the device during commissioning, configuring, and/or maintaining the system. This manual process is time consuming and does not allow dynamic configuration and control of the lighting system because each lighting component ID must be ascertained, recorded, and associated with the type, technical details, and physical location of the individual lighting component. The process does not, for example, automatically or dynamically identify, configure, group, and/or set dimming protocols for replacement lighting components even where the replacements are the same brand and type with different manufacturing tolerances.

For purposes of this disclosure, "automated" or "automatically" means generally and without limitation, performed substantially without manual intervention, for example from a human operator.

For purposes of this disclosure, "dynamic" means generally and without limitation automatically adjustable or configurable in response to one or more changes in conditions.

Another identification method is to use barcodes or other scan-able ID media to identify a lighting device with, for example, a manual barcode scanning device. In one example of this process, a barcode associated with the lighting device is manually removed from the lighting device and affixed to a representative location for the device on a floorplan/installation drawing. The barcode may be manually scanned, for example with a handheld tool, and a human operator may use the lighting device information associated with the barcode to enter or update information within a software-based commissioning application. Alternatively, the barcode may be scanned with a costly, high-resolution camera that requires zoom functions and other features to effectively read a barcode from a handheld tool that a human operator must use from a relatively far distance compared to the location of the luminaire itself. This process still requires time consuming manual handling of the barcode or expensive components and data entry and does not dynamically and/or automatically integrate lighting devices into the lighting control system as previously described.

A further method is to use a "service pin" on the lighting device. A service pin is a physical button on one or more associated lighting devices (such as a luminaire) that initiates a commissioning protocol for the device(s). The commissioning protocol, among other things, retrieves a unique network address of the lighting device—such as the luminaire—and displays the network address to a user (e.g., on a user interface) for manual entry in a lighting/location commissioning tool. The process therefore requires time consuming manual aspects and does not dynamically or automatically integrate lighting devices into the lighting control system.

A still further lighting device identification method is to use a wink function to facilitate observational identification of luminaires particularly with networked Digital Addressable Lighting Interface (DALI®) addressed devices. In an example of this process, a software-based commissioning application or tool may scan the lighting control network to detect devices that have not previously been located in the lighting system. Each device that has not been previously located is "winked," i.e., flashed on and off. A user may physically observe the winking and manually assign each winking device to a physical location and associated network address. Once again, this process requires time-consuming user intervention and does not include an automated dynamic lighting device configuration aspect.

As discussed above, the time and labor expended on manual lighting control system configuration can be extensive especially for lighting control networks in large spaces such as floors, buildings, and beyond. In addition, lumen (LED) degradation due to testing procedures, age, or changing environmental conditions may change the overall lumen level of the environment in which the luminaires are installed and require manual adjustments to the remaining luminaires to re-establish the overall lumen level in the environment. This, too, can be a time consuming process with no specific procedure for achieving the overall lumen level of the environment in the most efficient manner possible. For purposes of this disclosure, "environment" means generally and without limitation a space or area in which one or more luminaires or lighting systems is installed.

Further, with the emergence of Internet of Things (IoT)-based lighting control systems, e.g., networked or "smart" lighting control systems that have integrated control capabilities and are communicatively connected to data servers, cloud servers, internet storage, mobile devices, apps, and/or other network-connected programs, etc., provide a method of identifying lighting devices and their associated configurations and properties to efficiently integrate the lighting devices into the networks and systems of which they form a part. However, this technique does not provide an automated dynamic device, system, or method capable of reading a barcode and generating information regarding the type, location, and dimming profile of the luminaire, among other things.

In view of the above, exemplary devices, systems, and methods for automated dynamic lighting device initialization, configuration, and maintenance, among other things, are disclosed.

BRIEF DESCRIPTION OF THE EXEMPLARY EMBODIMENTS

This disclosure generally relates to, among other things, devices, systems, and methods for automated luminaire identification, configuration, and maintenance in a lighting system. In particular, this disclosure relates to devices, systems, and methods for automated dynamic luminaire identification, configuration, and maintenance using a barcode in a networked lighting system. For purposes of this disclosure, "automated" or "automatically" means generally, for example and without limitation, performed substantially without manual intervention. Further, for purposes of this disclosure, "dynamic" means generally, for example and without limitation, automatically adjustable or configurable in response to one or more changes in conditions. In addition, for purposes of this disclosure, the phrases "devices," "systems," and "methods" may be used either individually or in any combination referring without limitation to disclosed components, grouping, arrangements, steps, functions, or processes.

In particular, this disclosure relates in an exemplary embodiment to automated dynamic luminaire identification using one or more low-resolution sensors, (e.g., a color sensor/Red, Green, Blue (RGB) sensor) to read a barcode on the luminaire. The barcode is programmed with identifying information regarding the luminaire and its technical specifications. According to an aspect, the low-resolution sensor is fixed with a "constant lens"—i.e., a lens with a fixed magnification and field of view and lacking a zoom function—configured to read the bar code. The exemplary system may include at least one luminaire and/or LED, a sensor clip housing at least one sensor subsystem that includes one or more environment sensors and the low-resolution sensor fixed with the constant lens, at least one gateway, at least one cloud server, and at least one network gateway. At least one barcode-type medium is fixed on to each of the luminaires. For example and without limitation, the barcode may be printed on a plastic translucent sticker or paper, printed on a plastic semi translucent sticker or paper, etched directly into the luminaire itself, or attached/integrated into the luminaire or other lighting components in any manner consistent with this disclosure. In certain exemplary embodiments, the barcode may be a linear barcode or matrix (2D) barcode. In one aspect, the barcode may be black and white and/or in another aspect the barcode may be a color barcode.

One or more exemplary disclosed systems may further include a gateway capable of controlling illumination of the at least one luminaire via one or more dimming controls and/or dimming control protocols installed in and/or commanding the at least one lighting device/luminaire to allow the low-resolution sensor with constant lens a sufficient amount of light with which to read the barcode. For example, the light intensity of the luminaire may be reduced (i.e., by increasing the dimming level of the luminaire) to allow the low-resolution color sensor/RGB sensor fixed with constant lens to read the barcode and identify the luminaire. For purposes of this disclosure, higher or increasing dimming levels correspond to relatively lower or reducing brightness of the luminaire to a potential zero (0) brightness or OFF state. On the other hand, lower or decreasing dimming levels correspond to relatively higher or increasing brightness of the luminaire to a maximum brightness (at minimum or no dimming). Further, for purposes of this disclosure, "protocol" means generally, for example and without limitation, one or more actions or series or sets of actions, functions, or operations.

In the exemplary embodiments, the gateway is configured to at least store, communicate, set, or discover the dimming level or dimming control protocol of the at least one luminaire. The gateway may be capable of controlling the dimming level by controlling a power supply to the luminaire and is thereby capable of dimming the luminaire to 0 or shutting it off completely. The at least one luminaire and/or LED in the exemplary disclosed embodiment(s) are physically connected to the gateway via at least one dimming control interface. In the same or other embodiments, the connections may be wireless, networked, databased, or any other known communicative connection consistent with this disclosure.

In the exemplary disclosed embodiments, the exemplary sensor clip is adjustable for attaching to a variety of different luminaires (e.g., having different shapes). The exemplary sensor clip includes a sensor subsystem which, in certain exemplary embodiments, includes at least two sensors facing respectively upwards at the luminaire and downwards away from the luminaire. A first sensor on the sensor clip is an environment sensor dedicated to measuring conditions in an environment in which the luminaire or lighting system/components is installed. For purposes of this disclosure, "environment" means generally, for example and without limitation, any space in which the disclosed lighting device(s) and system(s) may be installed. The environment sensor may be arranged such that it faces away and/or extends in a downwardly fashion from the luminaire. A second sensor is an upward looking low-resolution color sensor/RGB sensor with a constant lens having a fixed zoom and field of view and arranged such that it faces the luminaire directly. The exemplary upward looking low-resolution color sensor/RGB sensor may have a constant lens of, for example and without limitation, 60 degrees, 90 degrees, or 120 degrees based on the position of the constant lens and the distance at which the low-resolution color sensor/RGB sensor must be placed to read the barcode and identify the luminaire at a given light intensity. In the exemplary disclosed embodiments, the upward looking sensor is a low-resolution color sensor/RGB sensor with a constant lens that is directed upward to face the barcode and/or luminaire directly; however, in the same or other embodiments the sensor subsystem may include any upward looking sensor that is a known sensor consistent with this disclosure. In addition, reference made herein for brevity to an upward looking sensor is understood to refer to a low-resolution color sensor/RGB sensor for purposes of disclosure of the exemplary disclosed embodiments, except where otherwise indicated. The phrase "upward" or "upward looking" generally relates to the orientation of a sensor, such as the exemplary low-resolution color sensor/RGB sensor, which faces the luminaire in the exemplary sensor system or clip.

The exemplary disclosed sensor clip(s) may be clipped in a variety of configurations onto luminaires having a variety of shapes and sizes by adjusting sliding mounting members of the sensor clip. Sliding attachment members on the exemplary sensor clip are movable for varying the dimensions of the sensor clip housing to connect the exemplary sensor clips to available attachment points on different luminaires. In the exemplary and other embodiments, the sliding mounting members on the sensor clip ensure that the upward looking (color/RGB) sensor(s) face the luminaire and the environment sensor(s) faces away or in a downward looking direction from the luminaire.

In another aspect, the disclosure is directed to a method of automated dynamic luminaire identification, configuration, and maintenance using barcodes. In an exemplary disclosed embodiment, the method may include providing a sensor clip configured for attaching to a luminaire have an identifying barcode and housing at least one sensor subsystem that includes one or more environment sensors and one or more color sensors such as at least one low-resolution color sensor/RGB sensor. The low-resolution color sensor/RGB sensor has a constant lens in certain exemplary disclosed embodiments. The color sensor/RBG sensor reads the barcode of the luminaire and thereby identifies the luminaire along with any or all information programmed into the barcode of the luminaire. The programmed information may include, for example and without limitation, the identify, type, dimming curve, and other aspects of the luminaire which may then by automatically and dynamically received and integrated into the lighting system. The location of the luminaire is similarly known from the location of the gateway that exerts control over illumination of the luminaire.

The exemplary method further includes controlling illumination of the luminaire via a gateway configured to, among other things, store, communicate, set, and schedule a dimming level and/or dimming control protocol of the luminaire at which the low-resolution color sensor/RGB sensor may read the barcode, based at least in part on the distance between the barcode and the low-resolution color sensor on the luminaire. In certain exemplary embodiments, the method also includes moving the sensor clip up and down on the luminaire via sliding one or more mounting members on the sensor clip to set a distance at which the sensor clip may read the barcode. In one aspect, the distance is correlated to the amount of light between the sensor and the barcode and is recommended by the luminaire manufacturer.

In certain exemplary embodiments, the method further includes providing at least one gateway capable of discovering the dimming control protocol of each of the lighting devices over which the gateway exerts control, controlling the dimming levels of the plurality of lighting devices via the gateway, reading the barcode by the low-resolution color sensor/RGB sensor with constant lens fixed to it, and identifying the luminaire. If the light intensity from the luminaire is too high, the barcode fails to read. Thus, the light intensity from the luminaire needs to be low enough for the color sensor/RGB sensor with constant lens fixed to it could be able to read the barcode thereby identifying the luminaire. The light intensity of the luminaire may be adjusted (lowered) by instructing the dimming control with any or all of the sensor subsystem either directly or via an instruction from the gateway or either directly or indirectly from a server via the gateway.

The exemplary method ultimately includes gathering and communicating by at least one gateway data for each luminaire of a plurality of luminaires in a dynamic group identification to at least one server, such as a cloud server, for further processing and/or group assignment.

These and other advantages will be apparent from the discussion of the exemplary embodiments. The preceding is a simplified summary to provide an understanding of some aspects of certain disclosed exemplary embodiments. This summary is neither an extensive nor exhaustive overview of the scope of the disclosure and its embodiments. The summary presents selected concepts of certain exemplary embodiments of the disclosures further below. Other embodiments consistent with the disclosure are possible utilizing, alone or in combination, the disclosed features set forth above, described further below, and known as consistent with the spirit and scope of this disclosure.

BRIEF DESCRIPTION OF THE FIGURES

A more particular description will be rendered by reference to specific exemplary embodiments thereof that are illustrated in the appended drawings. Understanding that these drawings depict only typical, exemplary embodiments thereof and are not therefore to be considered to be limiting of its scope, exemplary embodiments will be described and explained with additional specificity and detail through the use of the accompanying drawings in which.

Figure 1:
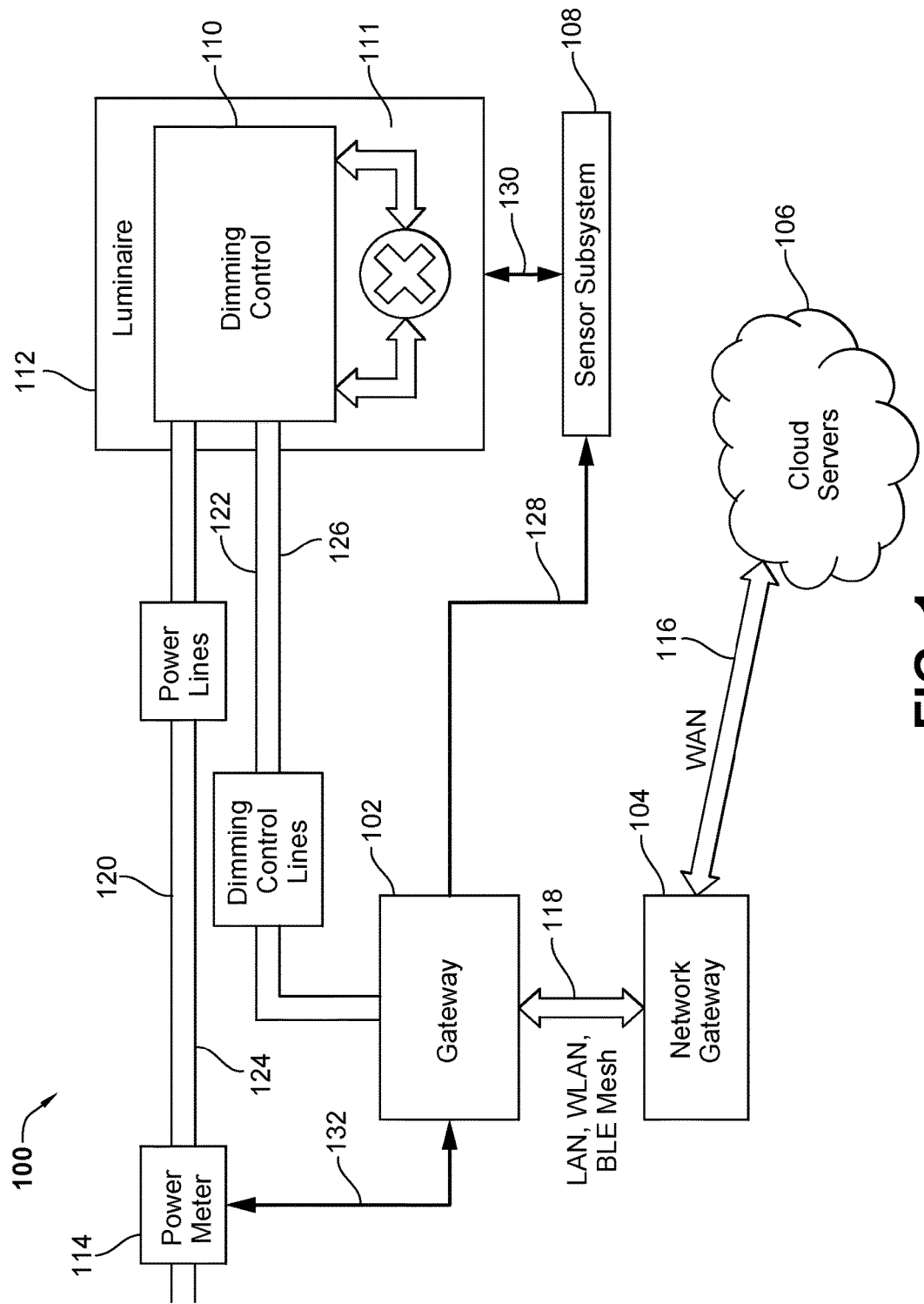
FIG. 1 illustrates a high-level system diagram of an exemplary gateway and the connected sensors and luminaire.

Various features, aspects, and advantages of the exemplary embodiments will become more apparent from the following detailed description, along with the accompanying figures in which like numerals represent like components throughout the figures and text. The various described features are not necessarily drawn to scale, but are drawn to emphasize specific features of some embodiments.

DETAILED DESCRIPTION OF THE EXEMPLARY EMBODIMENTS

Each exemplary embodiment is provided by way of explanation, and is not meant as a limitation and does not constitute a definition of all possible embodiments. The headings used herein are for organizational purposes only and are not meant to be used to limit the scope of the description or the claims. As used throughout this disclosure, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, non-volatile random access memory (NVRAM), or magnetic or optical disks. Volatile media includes dynamic memory, such as main memory or hard drive memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and other media consistent with this disclosure in which the software implementations of the disclosure are stored.

For purposes of this disclosure, electrical and/or communicative connections between components may be either physical or wireless except as expressly indicated or described for the illustrative exemplary embodiments. The disclosure does not limit the type of physical (hardware/wire/bus) or wireless interfaces between the gateway and other devices; e.g., the number of wires, the type of wires or bus connectors, the type of wireless area networks, or the wireless communication protocol. The connections and communications can be analog interface connectors and/or electrical/digital connectors of any kind.

With reference to FIG. 1, an exemplary system 100 for automated dynamic luminaire identification using barcode is described. The system 100 may be located in a space such as a region of a building generally referred to as an environment and including environmental conditions such as temperature, humidity, ambient light, audible sounds/noise, movements of passing people and objects, etc.

System 100 includes a luminaire 112 having at least one LED 111 and a dimming control 110, a sensor subsystem 108, a gateway 102, a cloud server 106, and a network gateway 108. Luminaire 112 is, for example, an electronic ballast luminaire and may be a single luminaire or a system including multiple luminaires connected via a single common interface to components such as power lines 120, 124 and dimming control lines 122, 126. Dimming control lines 122, 126 maybe be a two-wire or a four-wire connection when luminaire 112 is color-temperature control enabled. Luminaire 112 also includes a light source such as LED 111. In the exemplary system 100, luminaire 112 is a dimming luminaire 112 and includes dimming control 110 for controlling a dimming level of the luminaire 112/LED 111. In the disclosed devices, systems and methods, luminaire 112 further includes an identifying barcode (1012, FIGS. 3A-3C) on the luminaire 112 as discussed further below with respect to FIGS. 3A-3C.

In an exemplary embodiment, gateway 102 is a device such as a universal smart lighting gateway configured to, among other things, communicate with and control the luminaire 112. In an aspect, gateway 102 communicates with luminaire 112 to detect current conditions of the luminaire 112 in real time including, e.g., voltage, dimming level, etc. For purposes of this disclosure, "real time" means generally and substantially concurrent. The phrase "real time" does not imply any particular timeframe or limitation and is subject to inherent delays in technology, communication, processing, and other aspects of the subject activity. Other real time information or data collected by gateway 102 regarding the luminaire 112 may include a current power level of the luminaire 112 as measured by power meter 114, which measures the current power level being used by the luminaire 112, via power meter interface 132.

In another aspect, gateway 102 may be capable of detecting, communicating, and handling/controlling a plurality of dimming protocols for the luminaire 112 from the server 106, dimming control 110, and/or a user in a remote location. Based on the dimming protocols, gateway 102 may control dimming control 110 to provide a plurality of dimming levels to luminaire 112 including dimming the luminaire 112 to zero luminance. In another aspect, gateway 102 may control the power to the luminaire 112 to turn the luminaire 112 off or on.

With continuing reference to FIG. 1, sensor subsystem 108 connects via connection 130 to the luminaire 112 and via a sensor interface 128 to gateway 102. Sensor interface 128 and connection 130 may be physical or wireless connections. As discussed further below with respect to FIGS. 3A-5B, the sensor subsystem 108 in the disclosed devices, systems, and methods is contained in a sensor clip (308) attached to the luminaire 112. In an exemplary embodiment, sensor subsystem 108 detects information related to the system 100 and the luminaires 112 by detecting current conditions of the luminaire 112 and/or the environment in real time. In such embodiment, sensor subsystem 108 includes one or more environment sensors and one or more color sensors. The environment sensor(s) may include, for example, an ambient light sensor, movement detection sensor, and a temperature sensor. Environment sensors capture environmental data and human activities such as temperature, humidity, motion, direction of light and/or object movement, number of people passing through or present in a given environment ("footfall"), ambient light level and color temperature, etc. The environment sensor(s) face in a downward direction and/or away from the luminaire 112 to capture environment data. As discussed further below with respect to FIGS. 3A-5B, the color sensors in the disclosed devices, systems, and methods face the luminaire 112 to read an identifying barcode on the luminaire 112 and also to capture luminaire data such as color content, level, and intensity. Exemplary color sensors for use with the disclosed devices, systems, and methods is a low-resolution or very low-resolution (collectively, "low-resolution") color sensor such as a Red, Green, Blue (RGB) sensor, Yellow, Red, Green Blue (YRGB) sensor, and other sensors consistent with this disclosure. The low-resolution color sensor may be fixed with a constant lens, i.e., a lens without a zoom capability. The exemplary devices, systems, and methods allow a constant lens without such zoom capability to read a barcode. In other embodiments, any lens consistent with this disclosure, including a lens with zoom and/or movement capability, may be used. Gateway 102 is configured to communicate with sensor subsystem 108 and execute control over the sensor protocols via sensor interface 128.

With continuing reference to the exemplary embodiment shown in FIG. 1, system 100 further includes a backhaul interface 118 connected to the gateway 102 and a network gateway 104. The backhaul interface 118 may be wired or a Wireless Local Area Network (WLAN), including one or more of Mesh Bluetooth Low Energy (Mesh BLE), Smart Mesh, Bluetooth Mesh, ZigBee, and/or Ethernet Local Area Network (Ethernet LAN), and/or a Wide Area Network (WAN). In an exemplary embodiment, the backhaul interface 118 is Mesh BLE. According to an aspect, gateway 102 is connected with network gateway 104 connected to WAN 116. In the exemplary embodiment shown in FIG. 1, WAN 116 connects the gateway 102 to cloud server 106 via network gateway 104.

Accordingly, in the exemplary embodiment shown in FIG. 1, information or data sent to gateway 102 from the luminaire 112, sensor subsystem 108, and/or power meter 114 is relayed to network gateway 104 via backhaul interface 118 and on to cloud server 106 via WAN 116 for storage, processing, and/or other desired functions. Similarly, cloud server 106 transmits stored data, processing results, control instructions for luminaire 112, dimming control 110, and/or sensor subsystem 108, etc. to gateway 102 via WAN 116, network gateway 104, and backhaul interface 118.

Figure 2:
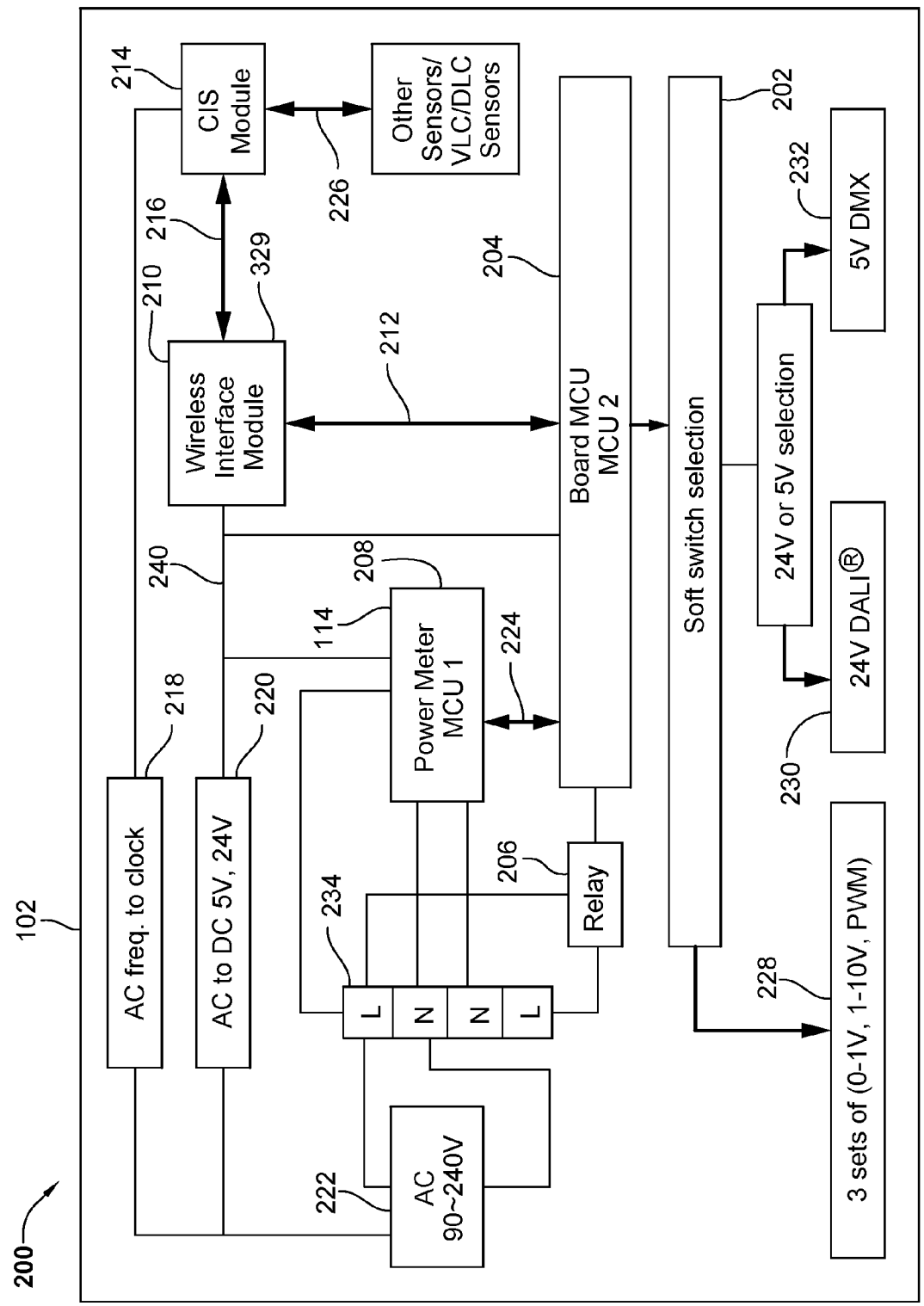
FIG. 2 illustrates a gateway box diagram of the exemplary gateway with sensors and connections to those sensors.

FIG. 2 depicts an embodiment 200 of the USLG 102. FIG. 2 illustrates a soft switch 202 to select between different electrical dimming interfaces for the one or more luminaires 112. This soft switch 202 may be actively used in the search for the correct protocol between the gateway 102 and the dimming control 110 of luminaire 112. The protocol modules 228, 230, and 232 are the software implementation of the dimming protocols that reside in the gateway 102. In one embodiment the supported dimming protocol includes several sets of protocols such as 0V-10V, 1V-10V, Pulse Width Modulation (PWM) 228 protocols over 0V-10V and/or 1V to 10V, a 24V DALI® 230 protocol, and a 5V Digital Multiplex (DMX) 232 protocol. The protocols' algorithms may be implemented in the Micro Controller Unit 2 (MCU 2) 204. According to an embodiment, the MCU 2 204 is powered by the AC to DC 5V, 24V 220 via the power line connection 240. MCU 2 204 is also connected to a power meter 114 via MCU 1 and a Universal Asynchronous Receiver/Transmitter (UART) 224. MCU 2 may also be connected to a Relay 206 and/or a Wireless Interface Module (WIM) 210 via a Serial Peripheral Interface (SPI) bus 212. In an embodiment, the MCU 2 204 is also controlling the Relay 206 that is configured to cut off current to the luminaire 112 upon a decision by the MCU 2 204. The power cutoff can be used to disconnect power from the controlled luminaire subsystem (See FIG. 1). In an embodiment the Wireless Interface Module (WIM) 210 is implemented as Bluetooth Low Power (BLE) device using Mesh BLE protocol to connect with other devices as well having SPI bus 212 and Inter-Integrated Circuit two-wire serial interface bus ("TWSI") 216. The WIM 210 may be connected to a sensor subsystem that may include a Camera Interface System (CIS) 214, which in the exemplary embodiments may include an environment sensor and, for example, a Red-Green-Blue (RGB) or Yellow-Red-Green-Blue (YRGB) sensor combination device and other sensors. The CIS module 214 can be extended via Two-Wire Serial Interface ("TWSI") bus 226 with other sensor modules. The CIS module 214 requires a clock, which is received via the AC Frequency to clock module interface 218. The WIM 210 requires power, which may be received via the AC to DC 5V to 24V 220 via power interface line 240. The AC Power 90V-240V 222 may be relayed to the MCU 2 204 and from it to the soft switch 202 for power selection for the dimming protocol interfaces. The AC Power 222 is also relayed to the power meter 114 which measures all power delivered to the luminaire. The LNNL 234 depicts the physical electrical line connections.

Figure 3A:
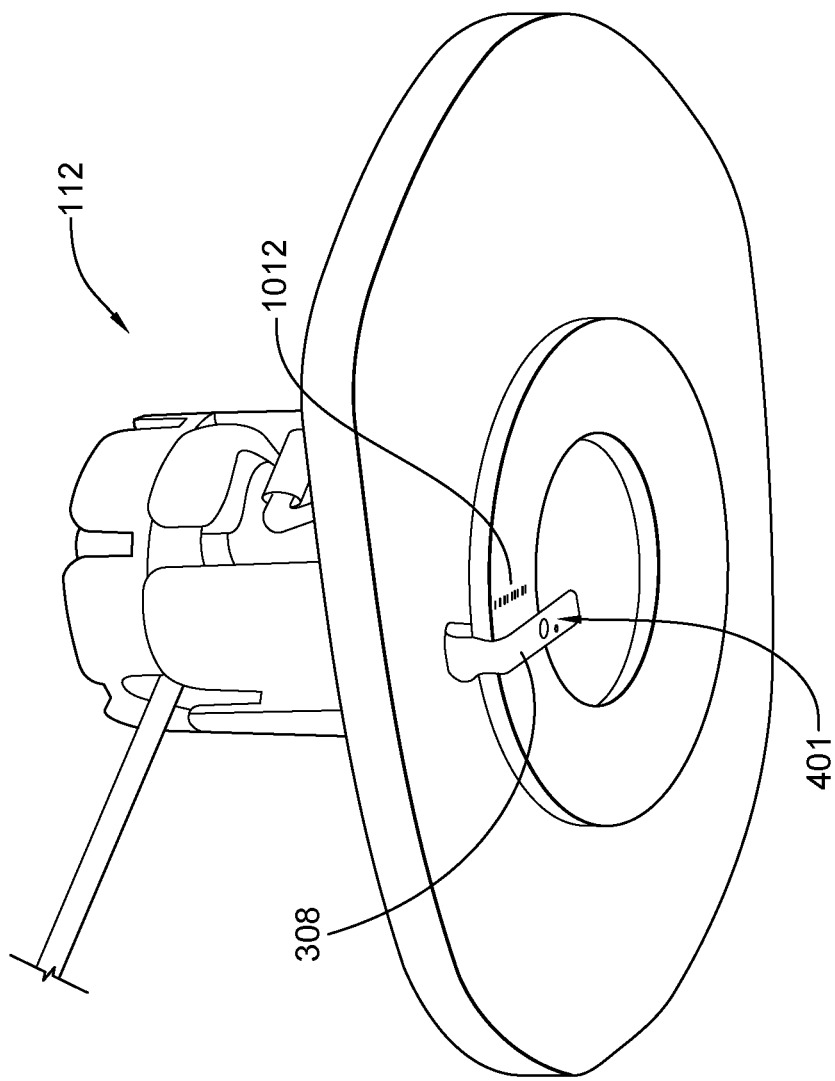
FIG. 3A illustrates a bottom view of an exemplary sensor clip attached to one type of luminaire.
Figure 3B:
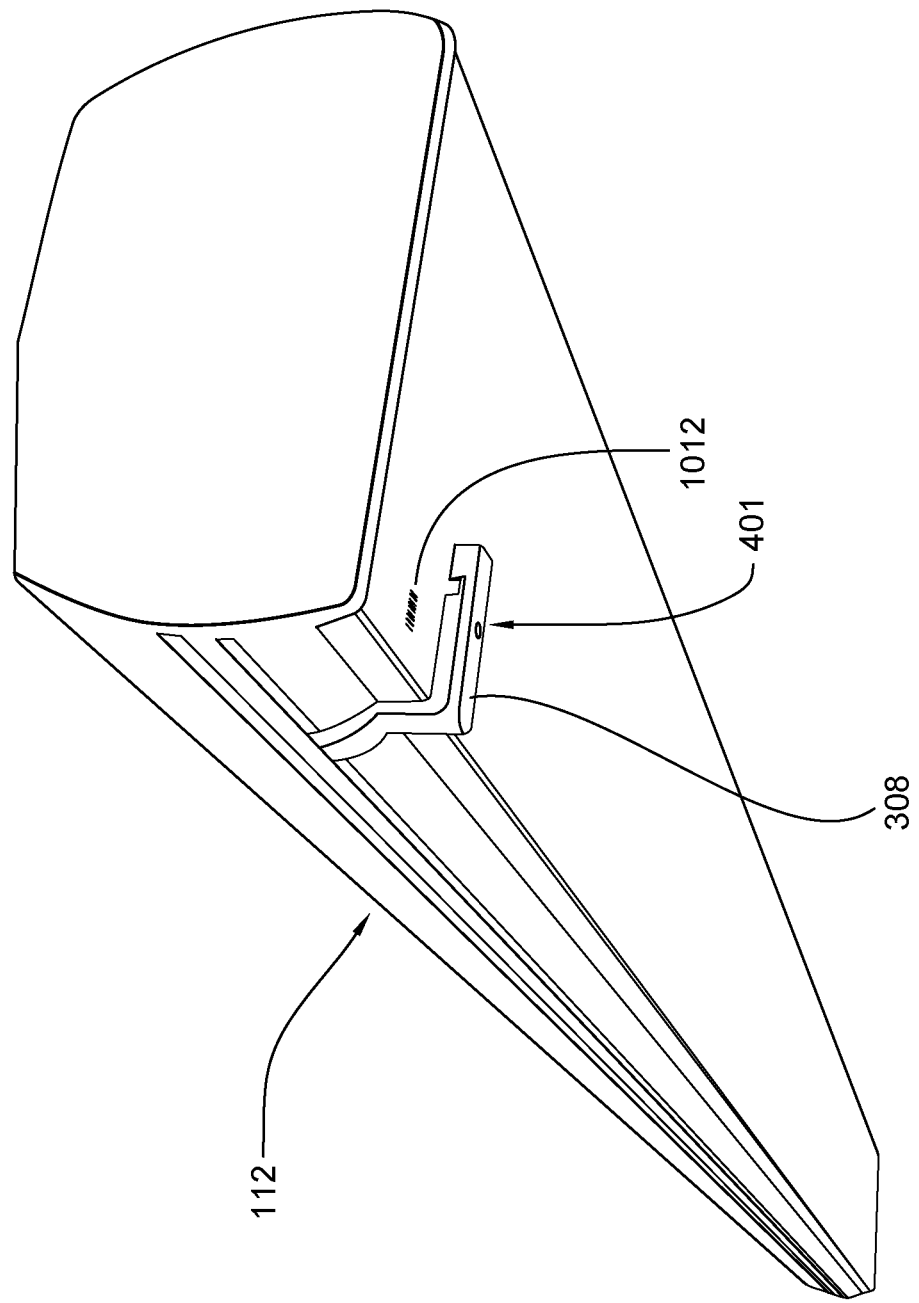
FIG. 3B illustrates a bottom view of an exemplary sensor clip attached to another type of luminaire.
Figure 3C:
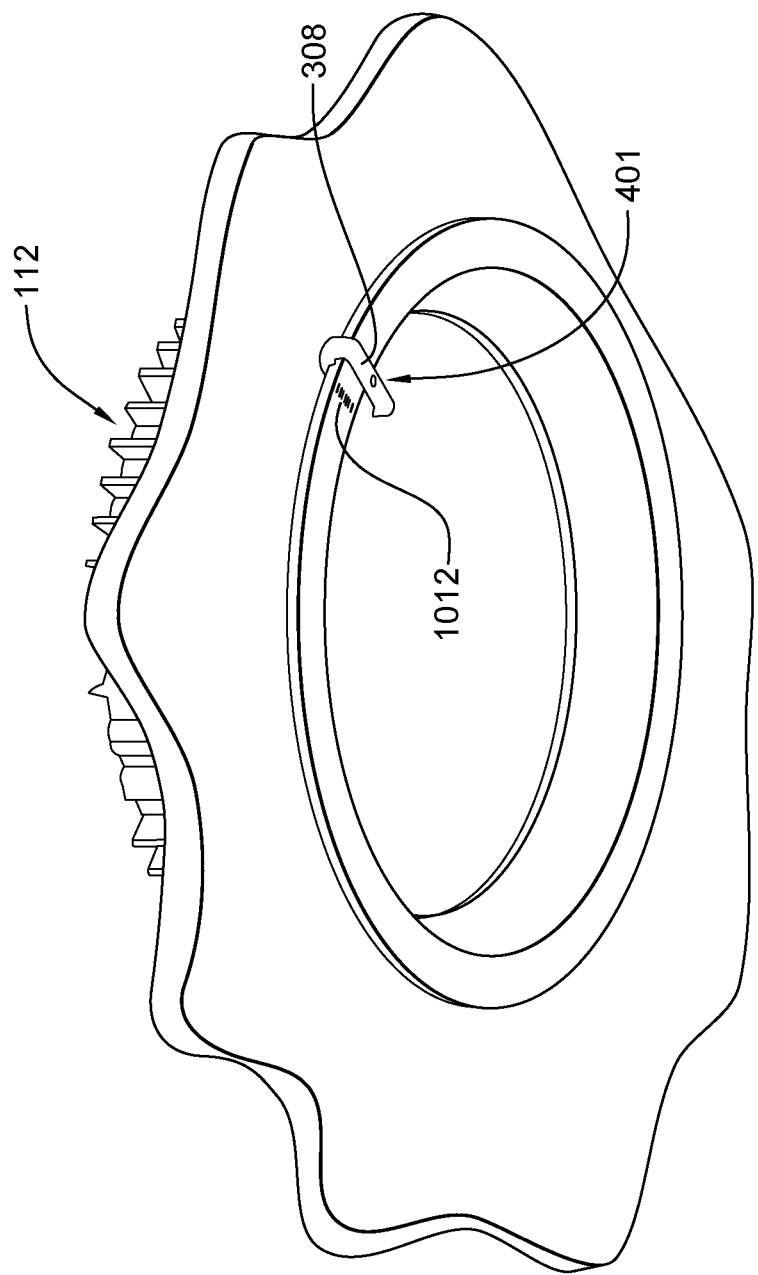
FIG. 3C illustrates a bottom view of an exemplary sensor clip attached to another type of luminaire.

With reference now to FIGS. 3A-3C, at least one barcode scan-able medium 1012 is fixed on each of the luminaires 112, for example in grooves or a label provided thereon. In different embodiments, the barcode 1012 may be printed on, among other things, a plastic translucent sticker or paper or a plastic semi translucent sticker or paper. Further, in different embodiments the barcode 1012 may be black or in another color.

Within continuing reference to the exemplary embodiments shown in FIGS. 3A-3C, the luminaire 112 is connected to one or more sensors found in the sensor subsystem 108 which is housed in a sensor clip 308. In other embodiments, the sensor may be found in any location, structure, or component consistent with this disclosure. The sensor may be configured to read one or more barcodes and/or sense the lumen intensity of one or more luminaires. In the case of the exemplary embodiment of FIGS. 3A-3C the sensor clip 308 is attachable to a variety of different luminaires (having different shapes from one another) as variously shown in FIGS. 3A-3C. In an exemplary embodiment, the sensor clip 308 includes a sensor subsystem 108 which includes at least two sensors situated back to back (i.e., facing in opposite directions) and can be clipped onto luminaires having a variety of shapes and sizes by adjusting a mounting thickness and front face width of the sensor clip 308 as discussed further below with respect to FIGS. 4A-5B.

The disclosed sensor clip 308 may also attenuate the luminous intensity of the emitted light coming out of the luminaires and thus extend the longevity and usability of the embedded sensor life. Examples of attenuating light on the sensor is described in commonly owned U.S. application Ser. Nos. 15/592,400 filed May 11, 2017 and 15/586,745 filed May 4, 2017, which are both incorporated herein by reference in their entirety.

As previously discussed, in an exemplary embodiment the sensor subsystem 108 includes a low-resolution color sensor/RGB sensor having a constant lens with a fixed and constant field of view which may be any angle consistent with this disclosure. In certain exemplary embodiments, the low-resolution color sensor/RGB sensor has a constant lens fixed to it such that the constant lens may be fixed at an angle of, for example, 60 degrees, 90 degrees, 120 degrees, or other angles as required for particular applications.

In one aspect, the exemplary upward looking sensor is used to read the barcode 1012 on the luminaire 112. The required distance from the barcode 1012 at which the upward looking sensor must be placed to read the barcode 1012 is determined on factors such as, without limitation, the size of the barcode, the resolution of the upward looking sensor 410, and the field of view of the upward looking sensor, e.g., the angle of the fixed lens. Accordingly, in the exemplary embodiments of the disclosed sensor clip 308 (see, e.g., FIGS. 4A-5B) the dimensions and configuration of certain components of the sensor clip 308 may be adjusted to bring the barcode 1012 (and/or lumen emission, see FIG. 4C) into view of the upward looking sensor (410, FIGS. 4A-5B). In the same or other embodiments where the adjusted sensor clip 308 is not capable of a configuration to read the barcode 1012 and/or lumen emission, an alternative barcode 1012 with a compatible size may be used. As previously discussed, in the exemplary disclosed embodiments the required distance from the barcode 1012 at which the sensor clip 308 and upward looking sensor 410 must be installed to read the barcode 1012 and/or lumen emission is determined by, among other things, the resolution of the upward looking sensor 410, the field of view of the upward looking sensor 410, and the size of the barcode 1012, because the upward looking sensor 410 in the exemplary disclosed embodiments has no zoom or auto-focus capability. In other embodiments, an upward looking sensor 410 may have such known zoom or auto-focus capability consistent with this disclosure. The following table illustrates approximate, exemplary sizes of barcodes 1012 and distances from an upward looking sensor 410 with a constant fixed lens required for the upward looking sensor 410 to read the barcode 1012.

Uplooking (RGB) sensor Beam Footprint Calculations (Angle is field of view, height is height of sensor clip, footprint is size (in mm) of window to fit barcode):

| Angle | Height | Footprint |
|---|---|---|
| 60 Degree | 3 mm | 3.9 × 3.9 |
|  | 4 mm | 5 × 5 |
|  | 5 mm | 6.2 × 6.2 |
|  | 6 mm | 7.4 × 7.4 |
|  | 7 mm | 8.5 × 8.5 |
| 90 Degree | 3 mm | 6.45 × 6.45 |
|  | 4 mm | 8.45 × 8.45 |
|  | 5 mm | 10.45 × 10.45 |
|  | 6 mm | 12.45 × 12.45 |
|  | 7 mm | 14.45 × 14.45 |
| 120 Degree | 3 mm | 10.8 × 10.8 |
|  | 4 mm | 14.3 × 14.3 |
|  | 5 mm | 17.7 × 17.7 |
|  | 6 mm | 21.2 × 21.2 |
|  | 7 mm | 24.7 × 24.7 |

In an exemplary embodiment, the design of the sensor clip 308 allows the location of the upward facing sensor(s) 410 to be adjusted, i.e., color sensors facing the luminaire 112, such that the low-resolution color sensor/RGB sensor can be placed facing the luminous opening of the luminaire 112, thereby minimizing the amount of light that may be blocked by the sensor clip 308. The positioning of the sensor clip 308 adjusts the location of sensor openings (401, 411, 415, FIGS. 4A-4C) on a sensor housing (404, FIGS. 4A-4C) such that the sensor can be positioned at a desired location relative to incoming light from the luminaire 112. The sensor clip 308 may be positioned at a pre-determined distance from the barcode 1012 so the upward looking sensor 410 can read the barcode 1012 positioned on the luminaire 112. If the light intensity from the luminaire 112 is too high, the (upward facing) color sensor 410 may fail to read the barcode 1012. In such case, the light intensity of the luminaire 112 may be lowered by increasing the dimming level of the luminaire 112 via dimming control 110, at the instruction of gateway 102, to a level at which the color sensor 410 may read the barcode 1012. Further, the upward looking (color) sensor 410 may sense the light intensity of a luminaire 112 and transmit the light intensity data to the server 106 either directly or via the gateway 102 for reference. The upward looking RGB sensor 410 and/or other sensors may also measure multiple color channels for color content including both visible and invisible light per needs of the algorithm.

Figure 4A:
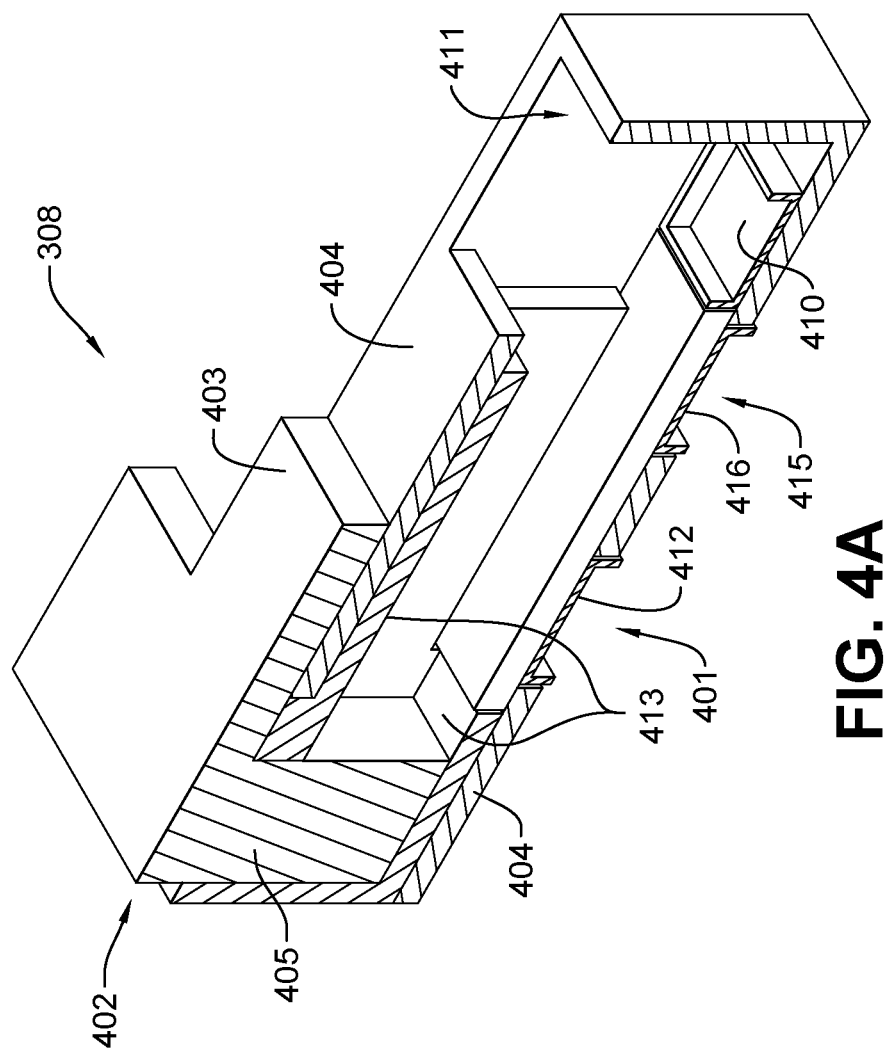
FIG. 4A illustrates a top perspective cross-sectional view of an exemplary sensor clip in a minimum dimensional configuration.
Figure 4B:
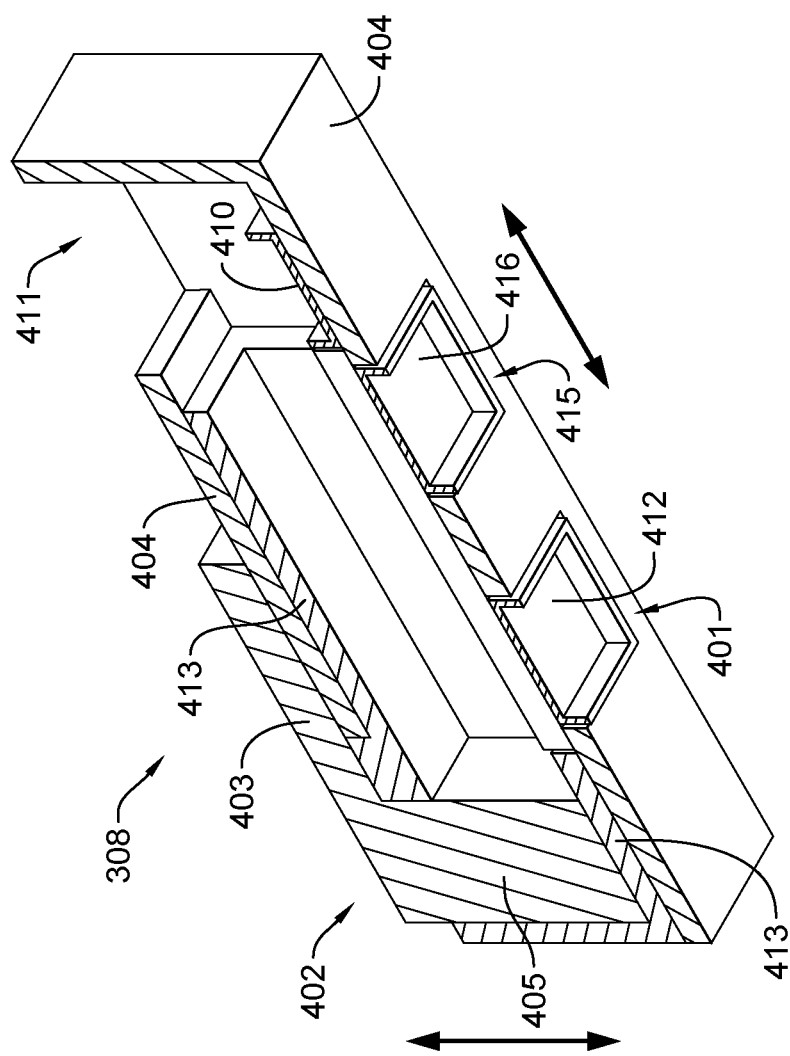
FIG. 4B illustrates a bottom perspective cross-sectional view of the exemplary sensor clip of FIG. 4A.

FIGS. 4A and 4B respectively depict top and bottom cross-sectional views of an exemplary sensor clip 308 in a minimum dimensional configuration according to the disclosure. As discussed further below, the minimum dimensional configuration means that sensor housing 404, sliding member 413, vertical leg 405, and attachment member 402 are not telescoped/extended and are approximately or substantially as close as possible to each other. The sensor clip 308 includes sensor housing 404 for containing the sensor subsystem 108. The sensor housing 404 is capable of being telescopically extended inwards and outwards relative to the luminaire 112 via sliding member 413. Sliding member 413 is engaged on one side to sensor housing 404 and on the other side to a vertical leg 405 of attachment member 402. Vertical leg 405 is telescopically engaged with sliding member 413 such that a height of the attachment member 402 may be adjusted for installation on a luminaire 112 via an attachment arm 403 that is connected to vertical leg 405 and extends therefrom in a direction toward sensor housing 404. In the exemplary embodiment shown in FIGS. 4A and 4B, the attachment arm 403 and vertical leg 405 are at a right angle to each other. The position of the sensor housing 404 and associated sensors relative to the luminaire 112 may be adjusted by adjusting the height of the attachment member 402 and the length of the sensor housing 404 from the sliding member 413. The sliding member 413 is inserted into an open side of sensor housing 404 and in the exemplary embodiment or in other embodiments the sliding member 413 may be configured as, for example, a hollow member for receiving the sensor housing 404. In the same or other embodiments, sliding member 413 is friction fit with sensor housing 404. Mechanical stops and limiters can be used to ensure that sliding member 413 does not become separated from sensor housing 404. Further disclosure regarding the sensor clip 308, including configuration and operation of sliding member 413, sensor housing 404, vertical leg 405, and attachment arm 403 is provided in commonly owned U.S. patent application Ser. No. 15/586,745 filed May 4, 2017 which is incorporated herein by reference in its entirety.

With continuing reference to FIGS. 4A-4B, the sensor housing 404 includes a top, light receiving opening 411 in the sensor housing 404 that is aligned with direct light from the luminaire 112 in the exemplary configuration of the sensor clip 308/housing 404 on the luminaire 112. The sensor housing 404 also includes bottom openings 401 and 415 positioned away from or in a downward direction, such as in an opposite direction as shown in FIGS. 4A and 4B, from the top opening 411. In the exemplary embodiment shown in FIGS. 4A and 4B, a low-resolution color sensor/RGB sensor with constant lens 410 is aligned with the top opening 411, and one more environment sensors (412, 416 in the exemplary embodiment shown in FIGS. 4A and 4B) is aligned or contained within with bottom openings 401 and 415. According to an aspect, the low-resolution color sensor/RGB sensor with constant lens 410 is positioned in the sensor housing 404 and is upward facing (i.e., towards the luminaire 112) and the environment sensors 412 and 416 are configured to face away and/or in a downward fashion from the luminaire 112. The upward-facing low-resolution color sensor/RGB sensor with constant lens 410 is positioned to face direct light from the luminaire 112 (see, for instance, FIG. 4C), while the environment sensors 412 and 416 are positioned to face away from the luminaire 112 and into the environment in which the luminaire 112 is installed. Thus, the environment sensors 412 and 416 do not face direct light from the luminaire 112.

In the exemplary embodiment of FIGS. 4A and 4B, the positions of the low-resolution color sensor/RGB sensor with constant lens 410 and environment sensors 412 and 416 are facing in substantially opposite directions (i.e., pointing at approximately 180 degrees from each other) such that the low-resolution color sensor/RGB sensor with constant lens 410 may upwardly and directly face the luminaire 112 and the environment sensors 412, 416 may downwardly monitor the environment in which the luminaire is installed. In the same or other embodiments, various sensors may be placed in different positions relative to each other and configured to receive varying levels of direct versus indirect illumination from the luminaire 112 according to the particular environment and application in which a sensor clip 308 is used. The sensor housing 404 and other components of the disclosed sensor clip 308 may be configured in any shape consistent with the disclosure and suitable for a particular application of a sensor clip.

With continuing reference to the exemplary embodiment shown in FIGS. 4A and 4B, extension of the sensor housing 404 and/or attachment member 402 via sliding member 413 can be varied to provide the required distance from the upward looking sensor 410 in the sensor clip 308 to the luminaire 112 and/or a barcode (not shown in FIGS. 4A and 4B). Once the distance from the upward looking sensor 410 to the luminaire 112 is set, the sensor clip 308 maintains the distance using, for example, friction fits or materials, fasteners, notched slots, magnets, or other known mechanisms or techniques for setting a position of a mechanical device. The disclosed exemplary embodiments of a sensor clip 308 such as shown in FIGS. 4A and 4B depict an embodiment of a sensor clip 308 that does not include an attenuation chamber or other filter devices for reducing the lumen level to which an upward looking sensor 410 may be exposed, because the disclosed exemplary embodiments of a lighting system 100 include a gateway 102 that is configured to control a dimming level of the luminaire 112 and adjust the light intensity to which the upward looking sensor 410 is exposed.

Figure 4C:
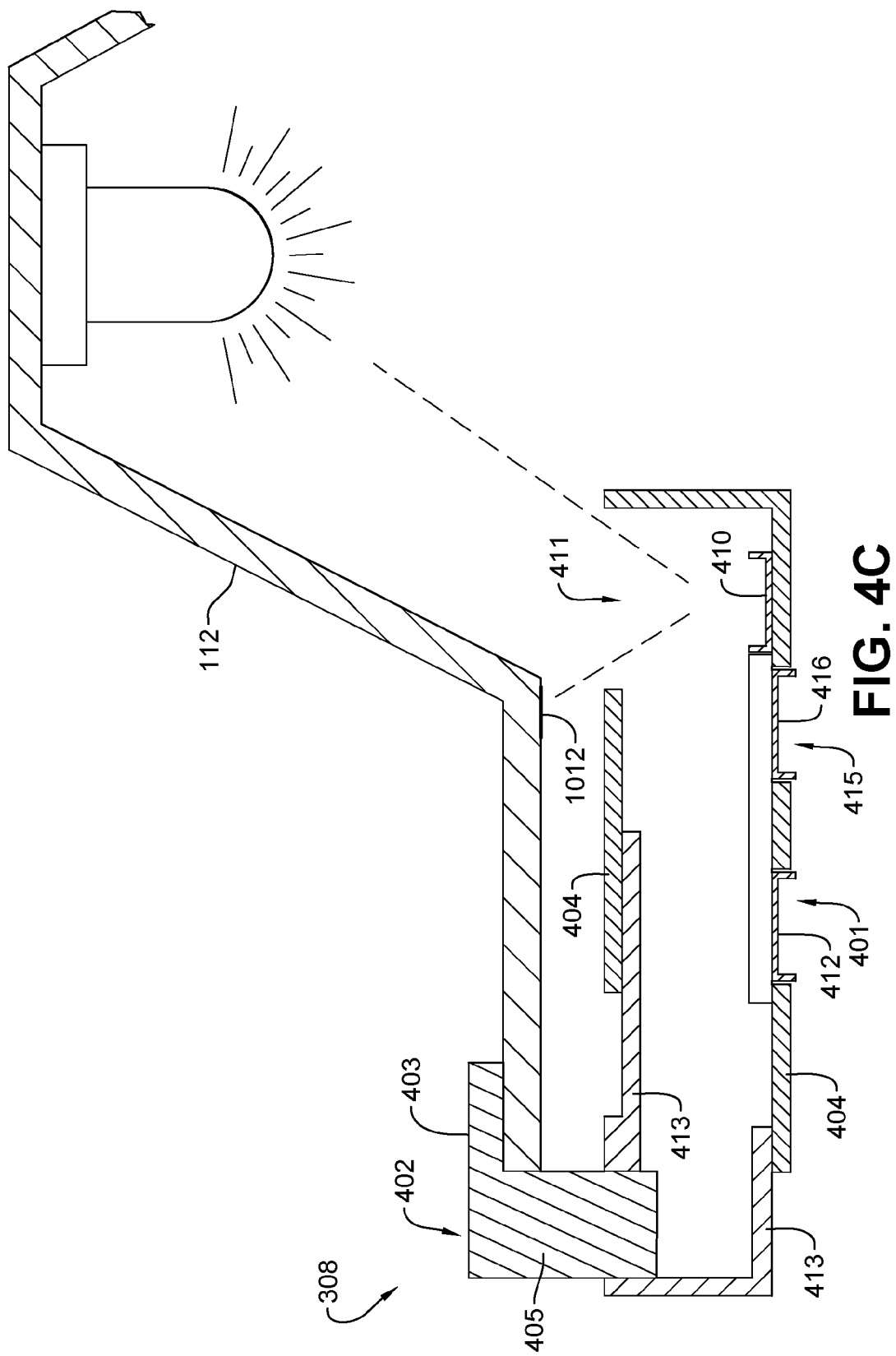
FIG. 4C is a cross-sectional side view of the exemplary sensor clip of FIGS. 4A and 4B in an expanded dimensional configuration and secured to the rim of a luminaire.

According to an aspect and as shown in FIG. 4C, the attachment arm 403 of the attachment member 402 is received above an edge or lip of luminaire 112 when the sensor clip 308 is attached to the luminaire and the lip or edge of the luminaire 112 is positioned between attachment arm 403 and sliding member 413 or sensor housing 404. The attachment arm 403 is configured to grasp above the projecting lip or other portion of the luminaire 112. The movement of sensor housing 404 with respect to sliding member 413 permits the low-resolution color sensor/RGB sensor with constant lens 410 to be moved to a desired horizontal position below luminaire 112.

The adjustable attachment member 402 and sensor housing 404 also allow the upward looking sensor 410 to be set at a suitable distance from the luminaire 112 and/or associated light source such as an LED. The sensor clip 308 may therefore be used with a variety of luminaires (circular, square, linear, etc.) and adjusted in the event that the light intensity is too high for the sensors to function properly. For example, the height of the attachment member 402 relative to the sensor housing 404 may be increased such that the sensor housing 404 sits further beneath the luminaire 112 and/or the position of the sensor housing 404 may be changed to decrease the amount of direct light to which the sensors are exposed. In practice, recommended positions for the attachment member 402 and sensor housing 404 relative to the sliding member 413 may be determined for different luminaire types.

As further shown in FIG. 4C, the exemplary sensor clip 308 is also configured to allow upward looking sensor 410 to see and read the barcode 1012 on the luminaire 112 at the same time as light from the luminaire 112 light source, because, for example and without limitation, the height of the attachment member 402 and the length of the sensor housing 404 have been adjusted to make both aspects visible through top opening 411.

Figure 5A:
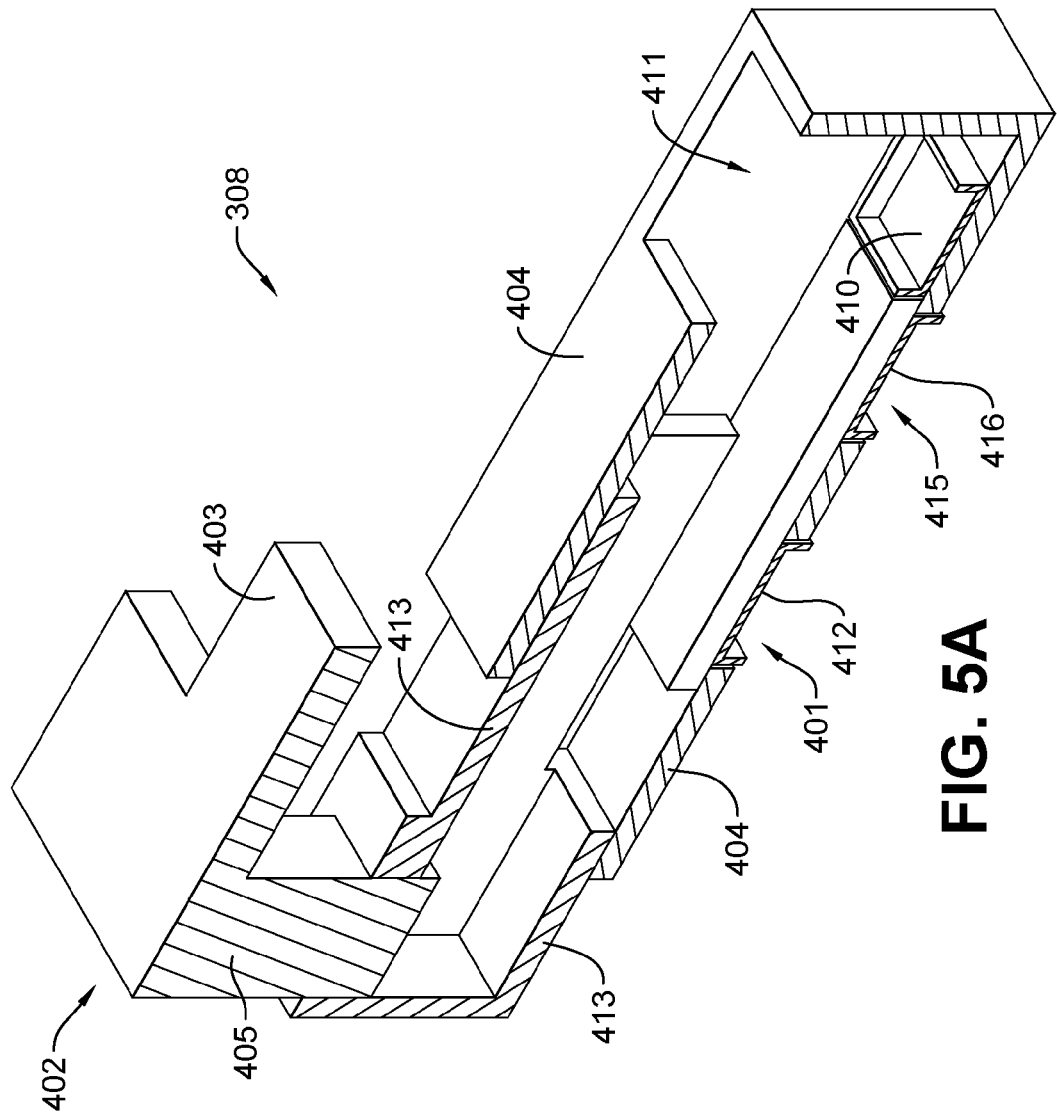
FIG. 5A illustrates a top perspective cross-sectional view of an exemplary sensor clip in an expanded dimensional configuration.
Figure 5B:
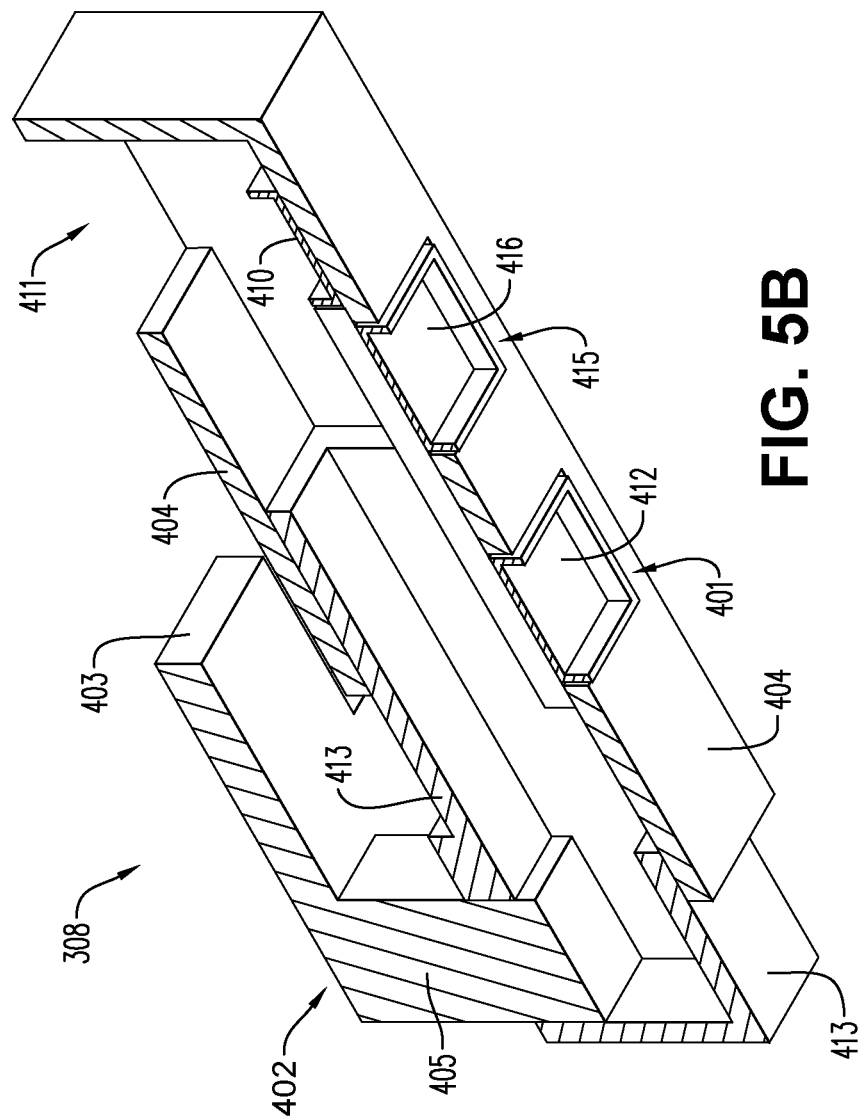
FIG. 5B illustrates a bottom perspective cross-sectional view of the exemplary sensor clip of FIG. 5A.

FIGS. 5A and 5B depict the exemplary sensor clip 308 in a fully extended position. In this position, the attachment member 402 is fully extended vertically and the sensor housing 404 is fully extended horizontally relative to sliding member 413.

The exemplary disclosed embodiments in, e.g., FIGS. 4A-5B include an exemplary sensor subsystem 108 on the exemplary sensor clip 308. However, in other embodiments the exemplary sensor subsystem 108 may be attached directly to the luminaire or the sensor subsystem 108 and/or sensor clip 308 may be attached to any other structure or location, such as a wall, ceiling, pillar, or other building structure, from which the sensor subsystem 108 may accomplish the disclosed functions of the sensor subsystem 108 and, in particular, the upward looking sensor 410. Such functions include, without limitation, reading one or more luminaire barcodes and/or measuring one or more luminaires' light intensity, color content, or color intensity. The location of the sensor subsystem 108 may, in certain embodiments, allow the sensor subsystem 108 and the upward looking sensor 410 to measure these parameters for more than one luminaire 112. Other factors that may determine whether a sensor may accomplish the above functions—and for how many luminaires—are, among other things, the resolution of the sensor, the field of view of the sensor, the presence of any obstructions near the sensor, etc.

Figure 6:
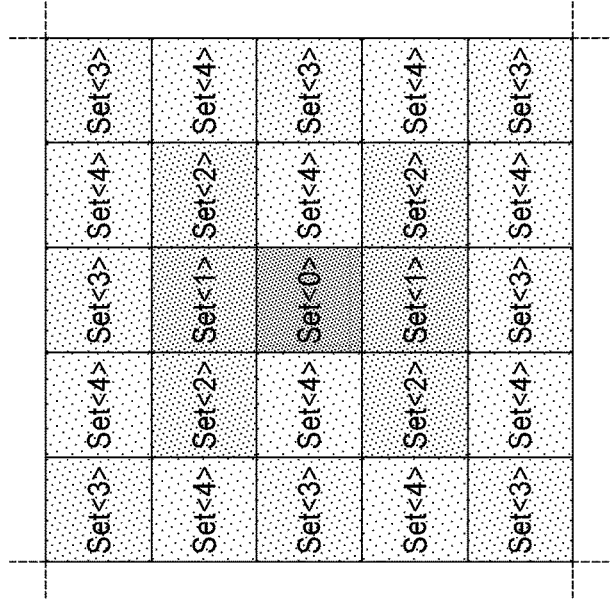
FIG. 6 illustrates an exemplary Red, Green, Blue (RGB) pixel array for use with the exemplary sensors according to the disclosure; and, FIG. 7 illustrates an exemplary method of automated dynamic luminaire identification using barcodes.
Figure 6:
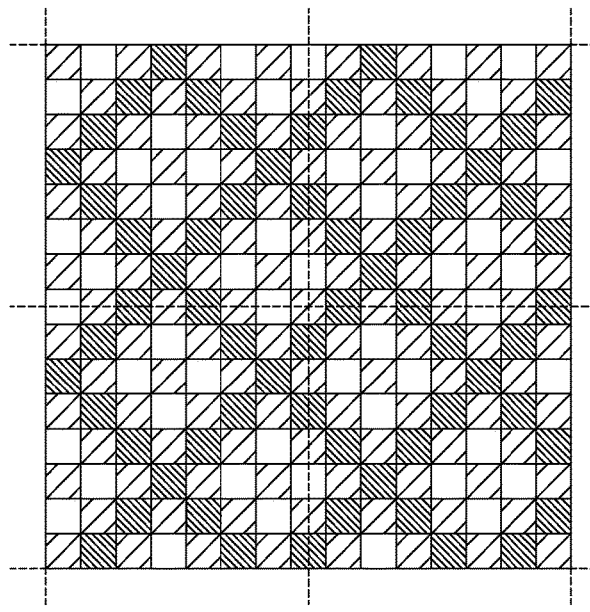
Figure 6:
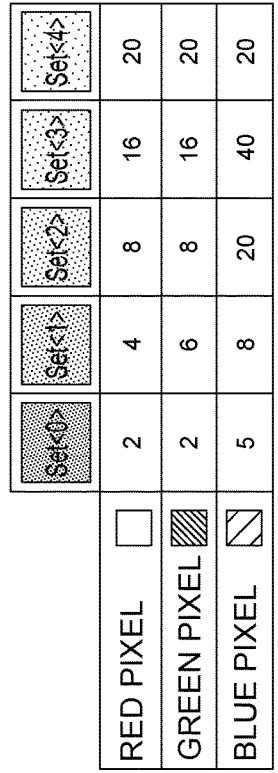
Figure 6:
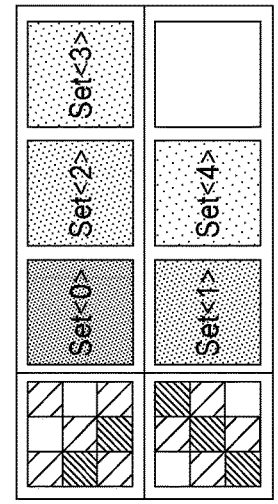

With reference now to FIG. 6, an RGB sensor for use in the sensor subsystem 108 has a pixel array for measuring both the RGB content of a light source and luminous flux. RGB filters and infrared (IR) cut filters are post-processed on photodiodes. FIG. 6 shows the distribution of RGB pixels in the photosensitive area of the chip. The RGB pixel array includes 15×15 photodiodes. Pixel size is 30 µm×30 µm with a fill factor around 75%. Each pixel has built-in transmission gate, which is controlled by the digital core. The light source is physically in close proximity to the RGB sensor chip. Therefore, the light intensity incident on the photodiodes might be unevenly distributed. To overcome this issue the RGB pixel array is mixed in a certain pattern as shown in top left of FIG. 6. Due to variations in the luminous flux of different light sources and uncertainty in the placement of the upward looking sensor 410 with respect to the light source, different photodiode areas will be subject to a varying amount of illumination. To cope with this wide dynamic range a programmable number of RGB photodiodes can be multiplexed together. This adds one more degree of freedom in addition to integration time and integration capacitance in the integrating amplifier. Furthermore, the sensitivity of the photodiodes covered with blue filters is around a factor of 3 smaller then for the red and green photodiodes. Therefore, the number of photodiodes covered with blue filter is larger than red and green photodiodes. A factor of 2.5 is used in the exemplary disclosed embodiments to provide an exemplary permutation between red, green and blue pixels.

The low-resolution color sensor in the disclosed exemplary embodiments includes about a 17×17 group of pixels that are sensing, for example, red, green, and blue. The image according to the photosensitive area is a 5×5 array in which each cell is 9 pixels which can sense at least three colors, for example red, green, and blue. In a barcode such as a square with 25 (5×5) cells (corresponding the to the 5×5 pixel array), each cell can be one of the 3 colors and the combination of cells may be used to uniquely number luminaires with up to, for example, 1,125,899,906,842,624 combinations (4 sets to the power of 25 (5×5 cells)), where no color—e.g. white space—is a fourth color to add to the possibilities.

Figure 7:
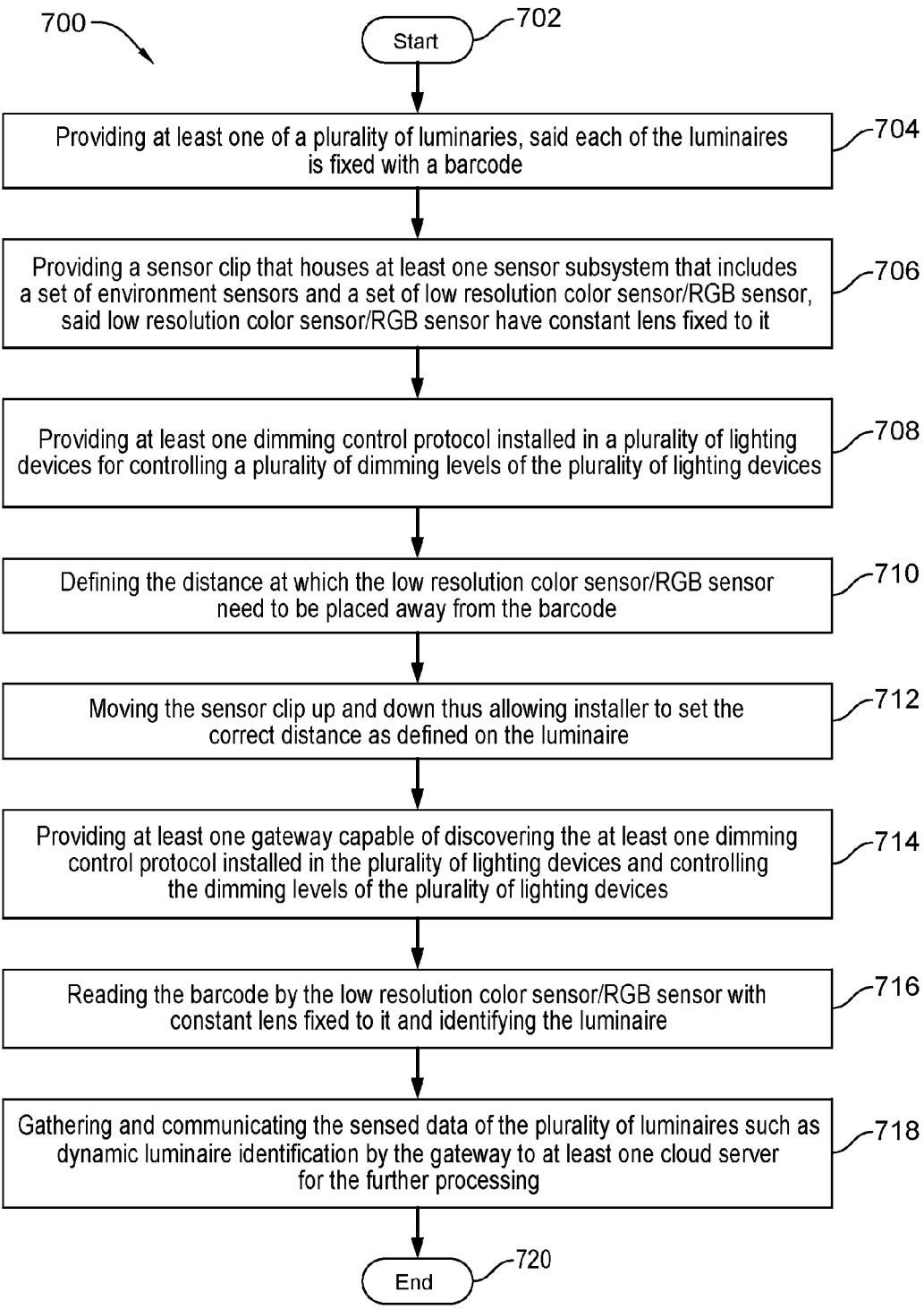

FIG. 7 illustrates a flow chart of an exemplary method for automated dynamic luminaire identification using a barcode. At step 704, at least one luminaire is provided fixed with a barcode. The barcode may be printed on, for example, a plastic translucent sticker or paper or a semi-translucent sticker or paper, etched into the luminaire, or provided on the luminaire in any fashion consistent with this disclosure. The barcode may be black or another color. At step 706, a sensor clip is provided with a sensor subsystem including a at least one environment sensor and at least one low-resolution color sensor/RGB sensor, the low-resolution color sensor/RGB sensor fixed with a constant lens. At step 708, at least one dimming control protocol is provided installed in a plurality of lighting devices for controlling a plurality of dimming levels of the plurality of lighting devices. At step 710, the distance at which the low-resolution color sensor/RGB sensor with constant lens need to be placed away from the barcode to read the barcode is defined. The specific distance range at which the sensor clip 308 must be installed to read the barcode is determined by, for example and without limitation, the resolution of the sensor, the field of view of the sensor, the size of the barcode, and the lumen level at the barcode. At step 712, the sensor clip is attached to the luminaire and its position is adjusted to the required distance from the luminaire and/or barcode, for example, by adjusting the vertical leg 405 and/or telescoping sensor housing. At step 714, a gateway capable of discovering the at least one dimming control protocol installed in the plurality of lighting devices and controlling the dimming levels of the plurality of lighting devices is provided. At step 716, the low-resolution color sensor/RGB sensor with constant lens fixed to it reads the barcode and identifies the luminaire according to the barcode. If the light intensity from the luminaire is too high to read the barcode, the dimming level of the luminaire and/or the position of the sensor clip can be adjusted. At step 718, data from the luminaire such as location, intensity, color, type, etc., is sent from the gateway to a server for further processing as part of the lighting system commissioning and configuring process.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system for automated dynamic luminaire identification using a barcode, the system comprising:
a gateway configured to control a dimming level of the luminaire;
at least one sensor configured in a position to read a barcode associated with the luminaire; and,
a server in data communication with at least one of the gateway and the sensor, wherein the gateway is further configured to adjust the dimming level of the luminaire to a level at which the sensor may read the barcode,
the sensor is further configured to read the barcode and transmit information regarding the barcode to the server either directly or via the gateway, and
the server is configured to identify the luminaire and/or instruct the gateway to adjust the dimming level of the luminaire, based at least in part on the information regarding the barcode.

2. The system of claim 1, wherein the at least one sensor is a color sensor configured to face the luminaire directly, the gateway and color sensor are respectively configured to transmit information regarding the luminaire to the server, and the color sensor is configured to transmit the information regarding the luminaire to the server either directly or via the gateway.

3. The system of claim 2, wherein the information regarding the luminaire includes at least one of the dimming level of the luminaire, the color content and/or color intensity of light that the luminaire emits, and the information regarding the barcode.

4. The system of claim 2, wherein the color sensor is configured to measure multiple color channels of light that the luminaire emits.

5. The system of claim 4, wherein the color sensor is at least one of a Red, Green, Blue (RGB) sensor and a Yellow, Red, Green, Blue (YRGB) sensor.

6. The system of claim 2, wherein the color sensor includes a pixel array.

7. The system of claim 1, wherein the sensor is connected to a sensor clip including at least one of an adjustable attachment member, an adjustable sensor housing, and a sliding member each configured to adjustably and removably connect the sensor clip to one or more different types of luminaires and/or fixtures in which the luminaires are installed.

8. The system of claim 7, wherein the sensor clip is configured to adjustably position the at least one sensor to read the barcode and/or face the luminaire directly and the sensor position is based at least in part on at least one of the field of view of the sensor, the resolution of the sensor, the size of the barcode, and the dimming level of the luminaire.

9. The system of claim 8, wherein the sensor has a constant lens.

10. The system of claim 1, wherein the barcode is printed on a plastic translucent or semi-translucent paper, etched into the luminaire, painted on the luminaire, affixed with a black and white barcode sticker on the luminaire, affixed with a color barcode sticker on the luminaire, and/or located on a component or structure other than the luminaire.

11. The system of claim 1, wherein the sensor is configured to read two or more barcodes and/or measure the color content and/or color intensity of two or more luminaires.

12. A method for automated dynamic luminaire identification using a barcode, the method comprising:
positioning at least one sensor in a location in which the sensor is configured to read a barcode that identifies a luminaire;
controlling illumination of the luminaire with a gateway configured to control a dimming level of the luminaire;
transmitting information regarding the barcode from the sensor to a server either directly or via the gateway; and
identifying with server the luminaire and/or instructing with the server the gateway to adjust the dimming level of the luminaire, based at least in part on the information regarding barcode.

13. The method of claim 12, wherein the at least one sensor is a color sensor configured to face the luminaire directly and the method further comprises transmitting information regarding the luminaire from the gateway and color sensor respectively to the server, wherein the color sensor is configured to transmit the information regarding the luminaire to the server either directly or via the gateway.

14. The method of claim 13, wherein the information regarding the luminaire includes at least one of the dimming level of the luminaire, the color content and/or color intensity of light that the luminaire emits, and the information regarding the barcode.

15. The method of claim 13, wherein the color sensor is configured to measure multiple color channels of light that the luminaire emits.

16. The method of claim 15, wherein the color sensor is at least one of a Red, Green, Blue (RGB) sensor and a Yellow, Red, Green, Blue (YRGB) sensor.

17. The method of claim 13, wherein the color sensor includes pixel array.

18. The method of claim 12, wherein the sensor is connected to a sensor clip including at least one of an adjustable attachment member, an adjustable sensor housing, and a sliding member each configured to adjustably and removably connect the sensor clip to one or more different types of luminaires and/or fixtures in which the luminaires are installed and the method further comprises adjustably positioning the at least one sensor to read the barcode and/or face the luminaire directly based at least in part on at least one of the field of view of the sensor, the resolution of the sensor, the size of the barcode, and the dimming level of the luminaire.

19. The method of claim 12, further comprising reading with the senor two or more barcodes and/or measuring with the sensor the color content and/or color intensity of two or more luminaires.

20. A system for reading a barcode to identify a luminaire, comprising:
a housing including a top, light receiving opening and an upward facing sensor; and, a gateway configured to control a dimming level of a luminaire via a dimming control;
wherein the housing is configured to attach to the luminaire and/or a fixture in which the luminaire is installed and adjust a position of the light receiving opening relative to the luminaire and/or a barcode associated with the luminaire such that the upward facing sensor is in a position to face the luminaire directly and/or read the barcode through the light receiving opening, and,
the gateway is configured to adjust the dimming level of the luminaire to a level at which the upward facing sensor may read the barcode.

* * * * *